(12) United States Patent
Imanari et al.

(10) Patent No.: US 6,960,310 B2
(45) Date of Patent: Nov. 1, 2005

(54) PHOSPHOR FOR VACUUM ULTRAVIOLET RAY-EXCITED LIGHT-EMITTING ELEMENT

(75) Inventors: Yuichiro Imanari, Tsukuba (JP); Takayoshi Ezuhara, Tsukuba (JP); Susumu Miyazaki, Fujishiro (JP)

(73) Assignee: Sumitomo Chemical Company, Limited, Osaka (JP)

( * ) Notice: Subject to any disclaimer, the term of this patent is extended or adjusted under 35 U.S.C. 154(b) by 19 days.

(21) Appl. No.: 10/695,981

(22) Filed: Oct. 30, 2003

(65) Prior Publication Data

US 2004/0084656 A1 May 6, 2004

(30) Foreign Application Priority Data

Oct. 31, 2002 (JP) ......................... 2002-317734

(51) Int. Cl.[7] .................. H01J 11/00; C09K 11/64; C09K 11/77; C09K 11/55
(52) U.S. Cl. .................. 252/301.4 R; 252/301.6 R; 313/468
(58) Field of Search .................. 313/468; 252/301.6 R, 252/301.4 R

(56) References Cited

U.S. PATENT DOCUMENTS

| | | | |
|---|---|---|---|
| 4,003,845 A | 1/1977 | Van Den Boom et al. | |
| 4,032,812 A | 6/1977 | Kobayashi et al. | |
| 4,153,572 A | 5/1979 | Wolfe | |
| 4,216,408 A | * 8/1980 | Verstegen et al. | ........... 313/468 |
| 4,631,144 A | 12/1986 | Beers et al. | |
| 5,169,557 A | 12/1992 | Sigai et al. | |
| 6,740,262 B2 | * 5/2004 | Oshio | ........................ 252/584 |

FOREIGN PATENT DOCUMENTS

| | | |
|---|---|---|
| EP | 0 993 022 A1 | 4/2000 |
| EP | 1 028 153 A1 | 8/2000 |
| JP | 5-86366 A | 4/1993 |
| JP | 8-115673 A | 5/1996 |
| JP | 10-1666 A | 1/1998 |
| JP | 10-195428 A | 7/1998 |
| WO | WO 99/34389 A1 | 7/1999 |

OTHER PUBLICATIONS

T. Hisamune et al., "Development of $Mn^{2+}$ Activated Ba–Sr–Mg–aluminate Green Phosphors for PDPs", The 3$^{rd}$ International Display Workshops, J. Illum. Engng. Inst. Jpn., vol. 83, No. 5 (1999), pp. 306–313 with Abstract.

"Phosphor Handbook", Phosphor Research Society, (Dec. 25, 1987), pp. 332.

* cited by examiner

*Primary Examiner*—C. Melissa Koslow
(74) *Attorney, Agent, or Firm*—Sughrue Mion, PLLC

(57) ABSTRACT

A phosphor for vacuum ultraviolet ray-excited light-emitting elements which comprises a compound represented by the following formula (I):

$$M^1{}_{1-a-b-c-d}M^2{}_aM^3{}_bM^4{}_{1-e}M^5{}_{11-f}M^6{}_{c-d+e+f}O_{19-(b+c+f)/2} \quad (I)$$

(wherein $M^1$ is at least one element selected from the group consisting of La, Y and Gd, $M^2$ is at least one element selected from the group consisting of Ce and Tb, $M^3$ is at least one element selected from the group consisting of Ca, Sr and Ba, $M^4$ is at least one element selected from the group consisting of Mg and Zn, $M^5$ is at least one element selected from the group consisting of Al and Ga, and $M^6$ is at least one element selected from the group consisting of Mn and Eu, and a, b, c, d, e and f are numbers satisfying the conditions of $0 \leq a < 1$, $0 \leq b \leq 0.6$, $0 \leq c \leq 0.5$, $0 \leq d \leq 0.5$, $0 \leq e < 1$, $0 \leq f < 1$, $a+b+c+d < 1$ and $0 < c+d+e+f$), respectively.

8 Claims, 1 Drawing Sheet

PHOSPHOR FOR VACUUM ULTRAVIOLET RAY-EXCITED LIGHT-EMITTING ELEMENT

BACKGROUND OF THE INVENTION

1. Technical Field

The present invention relates to a phosphor suitable for vacuum ultraviolet ray-excited light-emitting elements such as a plasma display panel (hereinafter referred to as "PDP") and a rare gas lamp, and a vacuum ultraviolet ray-excited light-emitting element in which said phosphor is used.

2. Description of Related Art

Phosphors are used in vacuum ultraviolet ray-excited light-emitting elements such as plasma display panels and rare gas lamps, and phosphors which emit lights under excitation with vacuum ultraviolet rays have already been known. Of these phosphors, as aluminate phosphors, there have been put to practical use $BaMgAl_{10}O_{17}$:Eu as a blue-emitting phosphor and $BaAl_{12}O_{19}$:Mn as a green-emitting phosphor. Furthermore, as aluminate phosphors used for vacuum ultraviolet ray-excited light-emitting elements, there have been proposed $Ba_{0.83}Al_{11.9}Mn_{0.05}O_{18.73}$ (see, e.g., JP-A-10-1666) or $CeMgAl_{11}O_{19}$:Tb (see, e.g., "Phosphor Handbook" compiled by Phosphor Research Society, p. 332, published by Ohmsha, Ltd. on Dec. 25, 1987) as a green-emitting phosphor, and $Ba_{0.9}Eu_{0.1}MgAl_{10}O_{17}$ (see, e.g., JP-A-8-115673) as a blue-emitting phosphor.

Here, vacuum ultraviolet ray-excited light-emitting elements generate plasma by discharging in a rare gas, and phosphors arranged in the vicinity of the places where plasma is generated are irradiated with vacuum ultraviolet rays radiated from the plasma to excite the phosphors, thereby to emit visible lights radiated from the phosphors. The phosphors are exposed to plasma. Conventional phosphors have the problem that luminance of the phosphors decreases after exposure to plasma, and there have been demanded to develop phosphors less in decrease of luminance after exposure to plasma.

BRIEF SUMMARY OF THE INVENTION

The object of the present invention is to provide a phosphor for vacuum ultraviolet ray-excited light-emitting elements which is less in decrease of luminance after exposure to plasma.

As a result of intensive research conducted by the inventors on the compositions of phosphors in an attempt to solve the above problems, it has been found that a phosphor containing a specific aluminate and/or gallate which contain a specific rare earth metal element, a specific alkaline earth metal element, Mg and/or Zn, Ce and/or Tb, and Eu and/or Mn exhibits strong emission of lights by excitation with vacuum ultraviolet rays and is less in decrease of luminance after exposure to plasma. Thus, the present invention has been accomplished.

That is, the present invention provides a phosphor for vacuum ultraviolet ray-excited light-emitting elements which comprises a compound represented by the following formula (I):

$$M^1_{1-a-b-c-d}M^2_aM^3_bM^4_{1-e}M^5_{11-f}M^6_{c+d+e+f}O_{19-(b+c+f)/2} \quad (I)$$

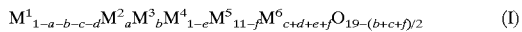

(wherein $M^1$ is at least one element selected from the group consisting of La, Y and Gd, $M^2$ is at least one element selected from the group consisting of Ce and Tb, $M^3$ is at least one element selected from the group consisting of Ca, Sr and Ba, $M^4$ is at least one element selected from the group consisting of Mg and Zn, $M^5$ is at least one element selected from the group consisting of Al and Ga, and $M^6$ is at least one element selected from the group consisting of Mn and Eu, and a, b, c, d, e and f are numbers satisfying the conditions of $0 \leq a < 1$, $0 \leq b \leq 0.6$, $0 \leq c \leq 0.5$, $0 \leq d \leq 0.5$, $0 \leq e < 1$, $0 \leq f < 1$, $a+b+c+d < 1$ and $0 < c+d+e+f$, respectively).

DETAILED DESCRIPTION OF THE INVENTION

Figure 1:
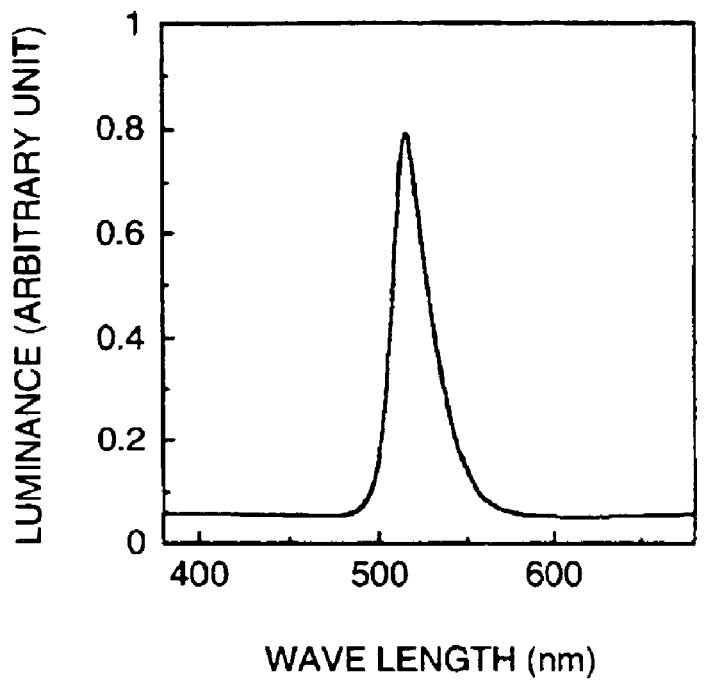
FIG. 1 is a graph showing a luminescence emission spectrum of the phosphor of Example 2 of the present invention.
Figure 2:
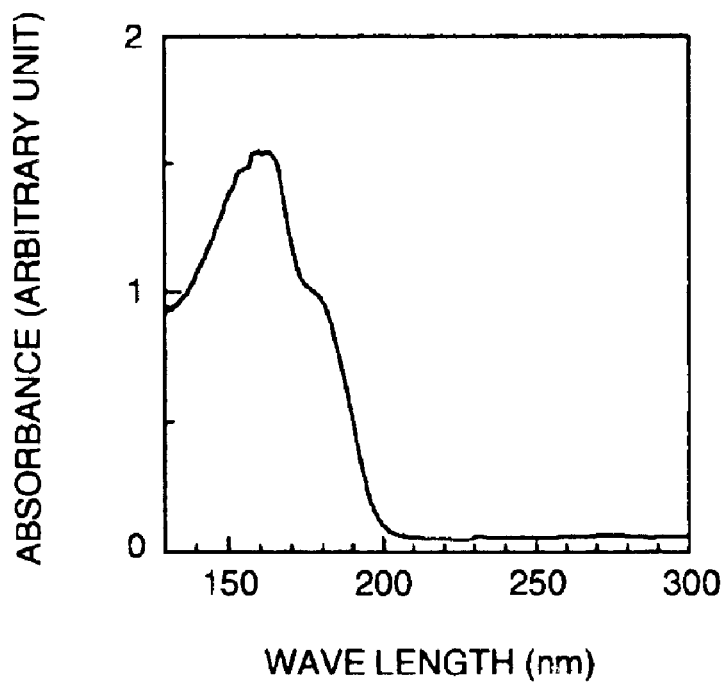
FIG. 2 is a graph showing an excitation spectrum of the phosphor of Example 2 of the present invention.

The present invention will be explained in detail below.

The phosphor for vacuum ultraviolet ray-excited light-emitting elements of the present invention comprises a compound represented by the following formula (I):

$$M^1_{1-a-b-c-d}M^2_aM^3_bM^4_{1-e}M^5_{11-f}M^6_{c+d+e+f}O_{19-(b+c+f)/2} \quad (I)$$

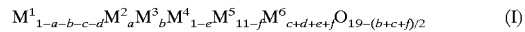

(wherein $M^1$ is at least one element selected from the group consisting of La, Y and Gd, $M^2$ is at least one element selected from the group consisting of Ce and Tb, $M^3$ is at least one element selected from the group consisting of Ca, Sr and Ba, $M^4$ is at least one element selected from the group consisting of Mg and Zn, $M^5$ is at least one element selected from the group consisting of Al and Ga, and $M^6$ is at least one element selected from the group consisting of Mn and Eu, and a, b, c, d, e and f are numbers satisfying the conditions of $0 \leq a < 1$, $0 \leq b \leq 0.6$, $0 \leq c \leq 0.5$, $0 \leq d \leq 0.5$, $0 \leq e < 1$, $0 \leq f < 1$, $a+b+c+d < 1$, and $0 < c+d+e+f$, respectively).

The amount of $M^6$ (at least one element selected from the group consisting of Mn and Eu) in the above formula (I) which is shown by c+d+e+f preferably satisfies $0.001 \leq c+d+e+f \leq 1$.

$M^4$ preferably consists of Mg and Zn rather than consisting of Mg or Zn each alone. The content of Zn in molar ratio of Zn/(Mg+Zn) satisfies preferably $0.05 \leq Zn/(Mg+Zn) \leq 0.8$, more preferably $0.1 \leq Zn/(Mg+Zn) \leq 0.6$, further preferably $0.2 \leq Zn/(Mg+Zn) \leq 0.4$.

$M^1$ preferably includes La, and more preferably consists of La and Y. The content of Y in molar ratio of Y/(La+Y) satisfies preferably $0.0001 \leq Y/(La+Y) \leq 0.8$, more preferably $0.001 \leq Y/(La+Y) \leq 0.5$, further preferably $0.01 \leq Y/(La+Y) \leq 0.2$.

$M^5$ preferably consists of only Al or two elements of Al and Ga. When $M^5$ consists of the two elements of Al and Ga, the higher the molar ratio of Al in $M^5$, namely, Al/(Al+Ga), the smaller the decrease of luminance after exposure to plasma, and hence more preferably, $M^5$ consists of only Al.

A phosphor containing a compound represented by the following formula (II), which is one embodiment of the formula (I) where $M^4$ is Mg and/or Zn, $M^5$ is Al and $M^6$ is Mn, and a=0, c=0 and d=0 is preferred since it exhibits emission of especially strong green color by excitation with vacuum ultraviolet rays.

$$(M^7_{1-g}M^8_g)(Mg_{1-h-i}Zn_h)Al_{11-j}Mn_{i+j}O_{19-(g+j)/2} \quad (II)$$

(wherein $M^7$ is at least one element selected from the group consisting of La, Y and Gd and $M^8$ is at least one element selected from the group consisting of Ca, Sr and Ba, and g, h, i and j are numbers satisfying the conditions of $0 < g \leq 0.6$, $0 \leq h \leq 1$, $0 \leq i \leq 0.5$, $0 \leq j \leq 0.5$, $h+i \leq 1$, and $0 < i+j \leq 0.5$, respectively. Preferably, h+i<1).

In the above formula (II), $M^8$ is preferably Ba. The amount of $M^8$ shown by g satisfies preferably $0.01 \leq g \leq 0.5$, more preferably $0.2 \leq g \leq 0.5$. The amount of Mn shown by i+j satisfies preferably $0.001 \leq i+j \leq 0.3$, more preferably $0.005 \leq i+j \leq 0.2$, further preferably $0.01 \leq i+j \leq 0.1$.

Furthermore, the phosphor containing the compound represented by the formula (II) exhibits especially high luminance when the amount of Zn shown by h satisfies $0.1 \leq h \leq 0.6$, and this range is preferred, and the range is more preferably $0.2 \leq h \leq 0.4$.

On the other hand, a phosphor containing a compound represented by the following formula (III), which is one embodiment of the formula (I) where $M^4$ is Mg and/or Zn, $M^5$ is Al and $M^6$ is Eu, and a=0, d=0, e=0 and f=0 is preferred since it exhibits emission of especially strong blue color by excitation with vacuum ultraviolet rays when calcined in a reducing atmosphere.

$$(M^9_{1-k-m}M^{10}_k Eu_m)(Mg_{1-n-n}Zn_n)Al_{11}O_{19-(k+m)/2} \quad (III)$$

(wherein $M^9$ is at least one element selected from the group consisting of La, Y and Gd and $M^{10}$ is at least one element selected from the group consisting of Ca, Sr and Ba, and k, m and n are numbers satisfying the conditions of $0<k \leq 0.6$, $0<m \leq 0.4$, $0 \leq n \leq 1$, and k+m<1, respectively).

In the above formula (III), $M^{10}$ is preferably Ba. The amount of $M^{10}$ shown by k satisfies preferably $0.01 \leq k \leq 0.5$, more preferably $0.2 \leq k \leq 0.5$, and furthermore the amount of Eu shown by m satisfies preferably $0.001 \leq m \leq 0.3$, more preferably $0.005 \leq m \leq 0.2$, further preferably $0.01 \leq m \leq 0.1$.

All numerical ranges in the specification and the claims are to be understood to encompass any and all subranges. For example, a range of $0 \leq a<1$ should be considered to include any and all subranges beginning with a minimum value of 0 or more and ending with a maximum value of less than 1, e.g. 0.1 to 0.9.

The compound of the present invention may be covered with metallic oxide such as MgO, CaO, SrO, BaO and $Al_2O_3$.

Next, the method for producing the phosphor of the present invention will be explained.

The method for producing the phosphor of the present invention is not particularly limited, and the phosphor can be produced, for example, by calcining a mixture of given metal compounds. The mixture of the given metal compounds is a mixture convertible to a phosphor containing the compound represented by the formula (I) by calcining. For example, a phosphor containing a compound represented by the compositional formula $La_{0.6}Ba_{0.4}Mg_{0.65}Zn_{0.3}Mn_{0.05}Al_{11}O_{18.8}$ which is one of the preferred compositions can be produced by weighing $La_2O_3$, BaO, MgO, ZnO, $MnO_2$ and $Al_2O_3$ so as to give the desired composition, mixing the compounds and calcining the mixture.

As the lanthanum compounds, yttrium compounds, gadolinium compounds, cerium compounds, terbium compounds, calcium compounds, strontium compounds, barium compounds, magnesium compounds, zinc compounds, aluminum compounds, gallium compounds, manganese compounds and europium compounds used for producing the phosphors of the present invention, there can be used, for example, hydroxides, carbonates, nitrates, halides, oxalates, etc. of high purity (99% or higher) which decompose at high temperatures to be convertible to oxides or oxides of high purity (99% or higher).

These compounds can be mixed using conventionally industrially employed a ball mill, a V shape mixing machine a stirring apparatus etc.

After mixing the compounds, the mixture is calcined by keeping it in a temperature range of 900–1700° C. for 1–100 hours to obtain the phosphor of the present invention. When hydroxides, carbonates, nitrates, halides, oxalates, etc. which are convertible to oxides upon decomposition at high temperatures are used as the metal compounds, they can be calcined at a temperature of, for example, not lower than 400° C. and lower than 900° C. before carrying out the calcining in order to convert the metal compounds to oxides or remove water.

The atmosphere used for the calcining is not particularly limited, and there can be used any of inert gas atmospheres such as nitrogen and argon; oxidizing atmospheres such as air, oxygen, oxygen-containing nitrogen and oxygen-containing argon; and reducing atmospheres such as hydrogen-containing nitrogen and hydrogen-containing argon. Preferred is, for example, a reducing atmosphere comprising an inert gas such as nitrogen or argon which contains 0.1–10% by volume of hydrogen. Furthermore, in order to carry out the calcining in a strong reducing atmosphere, a suitable amount of carbon may be added to the mixture of the metal compounds, followed by carrying out the calcining. The atmosphere for calcination may be any of inert atmosphere, oxidizing atmosphere and reducing atmosphere.

The calcining can be carried out twice or more for enhancing crystallinity of particles of the phosphor. Further, a flux can be added for enhancing the crystallinity.

The particles of the phosphor obtained by the above method can be ground by a method which is industrially usually employed, such as a ball mill or a jet mill. The grinding and calcining may be repeated two or more times. If necessary, the resulting phosphor powder can be subjected to washing or sieving.

Among the phosphors of the present invention obtained by the above method, the phosphors represented by the formula (II) emit usually green color under vacuum ultraviolet rays excitation and are especially small in decrease of luminance after exposure to plasma as compared with the green-emitting aluminate phosphor $Ba_{1.0}Mn_{0.1}Al_{11.9}O_{18.95}$ which has been put to practical use, and therefore these phosphors are suitable for vacuum ultraviolet ray excitation light emitting elements.

Moreover, the phosphors represented by the formula (III) emit usually blue color by excitation with vacuum ultraviolet rays and are especially small in decrease of luminance after exposure to plasma as compared with the blue-emitting aluminate phosphor $Ba_{0.9}Eu_{0.1}MgAl_{10}O_{17}$ which has been put to practical use, and therefore these phosphors are suitable for vacuum ultraviolet ray excitation light emitting elements.

The steps for production of PDP include steps of coating a substrate of PDP with a paste prepared by adding a binder and an organic solvent to the phosphor and calcining the coat at 300–600° C., but the phosphor of the present invention shows no decrease of luminance by this calcining and rather sometimes shows increase of luminance. Thus, the phosphor of the present invention is further suitable for PDP.

A method of production of PDP as one example of the vacuum ultraviolet ray-excited light-emitting elements prepared using the phosphor of the present invention will be explained below. For producing a PDP, there may be employed a known method disclosed, for example, in JP-A-10-195428 (U.S. Pat. No. 6,099,753). That is, each of blue-emitting, green-emitting and red-emitting phosphors for vacuum ultraviolet ray-excited light-emitting elements is mixed with a binder comprising, for example, a cellulose compound, a polymer compound such as polyvinyl alcohol and an organic solvent to prepare a phosphor paste. Each of the resulting phosphor pastes is coated on an inner surface of a back substrate provided with address electrodes, which is formed in a stripe shape by partition walls and on the surface of the partition walls by screen printing or the like, followed by calcining at 300–600° C. to form the respective phosphor layers. Thereon is superposed a surface glass substrate provided with a dielectric layer and a protective layer on the inner surface thereof so that transparent electrodes and bus electrodes thereof are arranged in the direction perpendicular to the phosphor layers, and the superposed surface glass substrate is bonded to the back substrate. The inside is evacuated and a rare gas of low pressure such as Xe or Ne is sealed therein to form discharge spaces. Thus, a PDP can be produced.

The phosphor of the present invention emits lights with high emission luminance upon excitation with vacuum ultraviolet rays and shows less decrease of luminance after exposure to plasma. Therefore, it is suitable for vacuum ultraviolet ray-excited light-emitting elements. According to the present invention, vacuum ultraviolet ray-excited light-emitting elements of high emission luminance and long life can be realized and are industrially very useful.

EXAMPLES

The present invention will be explained in more detail by the following examples, which should not be construed as limiting the invention in any manner.

The composition of the phosphor was analyzed in the following manner. The sample of the phosphor was taken out and melted by alkali fusion using sodium carbonate and boric acid as a flux. Water and hydrochloric acid were added to the molten sample to obtain a solution. The solution was analyzed using an Inductively Coupled Plasma Atomic Emission Spectrometry and the objective elements were quantitatively determined.

The measurement of luminance of the phosphor was conducted in the following manner. The phosphor was placed in a vacuum tank, the inside of which was kept at a vacuum of 6.7 Pa ($5 \times 10^{-2}$ torr) or lower, and the measurement was conducted by irradiation with vacuum ultraviolet rays using an excimer 146 nm lamp (model H0012 manufactured by Ushio Inc.). Furthermore, the phosphor was subjected to a heat treatment by keeping it at 500° C. for 30 minutes in the air, and thereafter the luminance was measured in the same manner as above. Moreover, the phosphor after subjected to the heat treatment was placed in an atmosphere having a pressure of 13.2 Pa and a composition of 5 vol % Xe-95 vol % Ne, and subjected to a plasma exposure treatment by exposing the phosphor to a plasma of 50 W for 15 minutes, and thereafter the luminance was measured in the same manner as above.

Example 1

Production of $LaMg_{0.95}Mn_{0.05}Al_{11}O_{19}$ (corresponding to the compound of the formula (I): $M^1_{1-a-b-c-d}M^2_aM^3_bM^4_{1-e}M^5_{11-f}M^6_{c+d+e+f}O_{19-(b+c+f)/2}$ wherein $M^1$ is La, $M^4$ is Mg, $M^5$ is Al, and $M^6$ is Mn, and a=0, b=0, c=0, d=0, e=0.05, and f=0):

Lanthanum oxide (purity: 99.99%; manufactured by Shin-Etsu Chemical Co., Ltd.), basic magnesium carbonate (purity: 99% or higher; manufactured by Kyowa Chemical Industry Co., Ltd.), aluminum hydroxide (purity: 99% or higher; manufactured by Sumitomo Chemical Co., Ltd.) and manganese carbonate (purity: 99.9%; manufactured by Wako Pure Chemical Industries, Ltd.) were weighed $La_2O_3$:$(MgCO_3)_4Mg(OH)_2 \cdot 5H_2O$:$Al_2O_3$:$MnCO_3$= 2.13:1.21:7.33:0.075 so as to give a molar ratio of La:Mg:Al:Mn=1.0:0.95:11.0:0.05, and these were mixed for 4 hours by a wet ball mill using isopropyl alcohol as a solvent. The solvent in the slurry was removed by an evaporator, and the slurry was dried to obtain a mixed powder. The mixed powder was calcined by keeping it at 1550° C. for 24 hours in an air atmosphere using an alumina crucible, and then slowly cooled to room temperature. Then, the calcined powder was re-calcined by keeping it at 1400° C. for 2 hours in a reducing atmosphere comprising a mixed gas of hydrogen and nitrogen (containing 2 vol % of hydrogen) using an alumina boat, and then slowly cooled to room temperature. The resulting phosphor was subjected to the heat treatment and the plasma exposure treatment, and luminance was measured. The phosphor emitted green color by irradiation with vacuum ultraviolet rays, and when luminance of the phosphor before subjected to each of the treatments was taken as 100, the luminance of the phosphor after the heat treatment was 100, and the luminance of the phosphor after the plasma exposure treatment was 99.

Example 2

Production of $La_{0.9}Y_{0.1}Mg_{0.95}Mn_{0.05}Al_{11}O_{19}$ (corresponding to the compound of the formula (I): $M^1_{1-a-b-c-d}M^2_aM^3_bM^4_{1-e}M^5_{11-f}M^6_{c+d+e+f}O_{19-(b+c+f)/2}$ wherein $M^1$ is $La_{0.9}Y_{0.1}$, $M^4$ is Mg, $M^5$ is Al, and $M^6$ is Mn, and a=0, b=0, c=0, d=0, e=0.05, and f=0):

The same procedure as of Example 1 was carried out, except that lanthanum oxide (purity: 99.99%; manufactured by Shin-Etsu Chemical Co., Ltd.), yttrium oxide (purity: 99.99%; manufactured by Shin-Etsu Chemical Co., Ltd.), basic magnesium carbonate (purity: 99% or higher; manufactured by Kyowa Chemical Industry Co., Ltd.), aluminum hydroxide (purity: 99% or higher; manufactured by Sumitomo Chemical Co., Ltd.) and manganese carbonate (purity: 99.9%; manufactured by Wako Pure Chemical Industries, Ltd.) were weighed $La_2O_3$:$Y_2O_3$:$(MgCO_3)_4Mg(OH)_2 \cdot 5H_2O$:$Al_2O_3$:$MnCO_3$=1.93:0.15:1.21:7.37:0.076 so as to give a molar ratio of La:Y:Mg:Al:Mn= 0.9:0.1:0.95:11.0:0.05. The resulting phosphor emitted green color by irradiation with vacuum ultraviolet rays, and showed a luminance higher by 6% as compared with the phosphor of Example 1. When luminance of the phosphor before subjected to each of the treatments was taken as 100, the luminance of the phosphor after the heat treatment was 104, and the luminance of the phosphor after the plasma exposure treatment was 100.

Example 3

Production of $La_{0.6}Ba_{0.4}Mg_{0.65}Zn_{0.3}Mn_{0.05}Al_{11}O_{18.8}$ (corresponding the compound of the formula (II): $(M^7_{1-g}M^8_g)(Mg_{1-h-i}Zn_h)Al_{11-j}Mn_{i+j}O_{19-(g+j)/2}$ wherein $M^7$ is La and $M^8$ is Ba, and g=0.4, h=0.3, i=0.05, and j=0):

The same procedure as of Example 1 was carried out, except that lanthanum oxide (purity: 99.99%; manufactured by Shin-Etsu Chemical Co., Ltd.), barium carbonate (purity: 99.9%; manufactured by Wako Pure Chemical Industries, Ltd.), basic magnesium carbonate (purity: 99% or higher; manufactured by Kyowa Chemical Industry Co., Ltd.), zinc oxide (purity: 99% or higher; manufactured by Kyowa Chemical Industry Co., Ltd.), aluminum hydroxide (purity: 99% or higher; manufactured by Sumitomo Chemical Co., Ltd.) and manganese carbonate (purity: 99.9%; manufactured by Wako Pure Chemical Industries, Ltd.) were weighed $La_2O_3:BaCO_3:(MgCO_3)_4Mg(OH)_2$·$5H_2O:ZnO:Al_2O_3:MnCO_3=1.26:1.02:0.82:0.31:7.25:0.074$ so as to give a molar ratio of La:Ba:Mg:Zn:Al:Mn= 0.6:0.4:0.65:0.3:11.0:0.05. The resulting phosphor showed strong green color emission by irradiation with vacuum ultraviolet rays, and had a luminance higher by 54% as compared with the phosphor of Example 1. The phosphor was subjected to the heat treatment and the plasma exposure treatment, and luminance thereof was measured. The resulting phosphor emitted green color by irradiation with vacuum ultraviolet rays. When luminance of the phosphor before subjected to each of the treatments was taken as 100, the luminance of the phosphor after the heat treatment was 103, and the luminance of the phosphor after the plasma exposure treatment was 100.

Comparative Example 1

Production of $Ba_{1.0}Mn_{0.1}Al_{11.9}O_{18.95}$:

Barium carbonate (purity: 99.9%; manufactured by Wako Pure Chemical Industries, Ltd.), aluminum hydroxide (purity: 99% or higher; manufactured by Sumitomo Chemical Co., Ltd.) and manganese carbonate (purity: 99.9%; manufactured by Wako Pure Chemical Industries, Ltd.) were weighed $BaCO_3:Al_2O_3:MnCO_3=2.57:7.91:0.15$ so as to give a molar ratio of Ba:Al:Mn=1.0:11.9:0.1, and were mixed for 4 hours by a wet ball mill using isopropyl alcohol as a solvent. Then, the solvent was removed by an evaporator and the slurry was dried to obtain a mixed powder. The resulting mixed powder was calcined by keeping it at 1450° C. for 2 hours in a reducing atmosphere comprising a mixed gas of argon and hydrogen (containing 2 vol % of hydrogen) using an alumina boat, and then slowly cooled to room temperature. The resulting phosphor was subjected to the heat treatment and the plasma exposure treatment, and luminance was measured. The phosphor emitted green color by irradiation with vacuum ultraviolet rays, and when luminance of the phosphor before subjected to each of the treatments was taken as 100, the luminance of the phosphor after the heat treatment was 100, and the luminance of the phosphor after the plasma exposure treatment was 72.

Example 4

Production of $La_{0.99}Eu_{0.01}MgAl_{11}O_{18.995}$ (corresponding to the compound of the formula (I): $M^1_{1-a-b-c-d}M^2_aM^3_bM^4_{1-e}M^5_{11-f}M^6_{c+d+e+f}O_{19-(b+c+f)/2}$ wherein $M^1$ is La, $M^4$ is Mg, $M^5$ is Al, and $M^6$ is Eu, and a=0, b=0, c=0.01, d=0, e=0 and f=0):

The same procedure as of Example 1 was carried out, except that lanthanum oxide (purity: 99.99%; manufactured by Shin-Etsu Chemical Co., Ltd.), basic magnesium carbonate (purity: 99% or higher; manufactured by Kyowa Chemical Industry Co., Ltd.), aluminum hydroxide (purity: 99% or higher; manufactured by Sumitomo Chemical Co., Ltd.) and europium oxide (purity: 99.99%; manufactured by Shin-Etsu Chemical Co., Ltd.) were weighed $La_2O_3:(MgCO_3)_4Mg(OH)_2·5H_2O:Al_2O_3:Eu_2O_3=2.11:1.27:7.34:0.023$ so as to give a molar ratio of La:Mg:Al:Eu=0.99:1.0:11.0:0.01. The resulting phosphor emitted blue color by irradiation with vacuum ultraviolet rays. When luminance of the phosphor before subjected to each of the treatments was taken as 100, the luminance of the phosphor after the heat treatment was 100, and the luminance of the phosphor after the plasma exposure treatment was 96.

Example 5

Production of $La_{0.59}Ba_{0.4}Eu_{0.01}MgAl_{11}O_{18.795}$ (corresponding to the compound of the formula (III): $(M^9_{1-k-m}M^{10}_kEu_m)(Mg_{1-n}Zn_n)Al_{11}O_{19-(k+m)/2}$ wherein $M^9$ is La and $M^{10}$ is Ba, and k=0.4, m=0.01 and n=0):

The same procedure as of Example 1 was carried out, except that lanthanum oxide (purity: 99.99%; manufactured by Shin-Etsu Chemical Co., Ltd.), barium carbonate (purity: 99.9%; manufactured by Wako Pure Chemical Industries, Ltd.), basic magnesium carbonate (purity: 99% or higher; manufactured by Kyowa Chemical Industry Co., Ltd.), aluminum hydroxide (purity: 99% or higher; manufactured by Sumitomo Chemical Co., Ltd.) and europium oxide (purity: 99.99%; manufactured by Shin-Etsu Chemical Co., Ltd.) were weighed $La_2O_3:BaCO_3:(MgCO_3)_4Mg(OH)_2·5H_2O:Al_2O_3:Eu_2O_3=1.26:1.04:1.28:7.38:0.023$ so as to give a molar ratio of La:Ba:Mg:Al:Eu=0.59:0.4:1.0:11.0:0.01. The resulting phosphor showed strong blue color emission by irradiation with vacuum ultraviolet rays, and had a luminance higher by 42% as compared with the phosphor of Example 4. When luminance of the phosphor before subjected to, each of the treatments was taken as 100, the luminance of the phosphor after the heat treatment was 100, and the luminance of the phosphor after the plasma exposure treatment was 98.

Comparative Example 2

Production of $Ba_{0.9}Eu_{0.1}MgAl_{10}O_{17}$:

The same procedure as of Comparative Example 1 was carried out, except that barium carbonate (purity: 99.9%; manufactured by Wako Pure Chemical Industries, Ltd.), basic magnesium carbonate (purity: 99% or higher; manufactured by Kyowa Chemical Industry Co., Ltd.), aluminum hydroxide (purity: 99% or higher; manufactured by Sumitomo Chemical Co., Ltd.) and europium oxide (purity: 99.99%; manufactured by Shin-Etsu Chemical Co., Ltd.) were weighed $BaCO_3:(MgCO_3)_4Mg(OH)_2·5H_2O:Al_2O_3:Eu_2O_3=2.52:1.38:7.23:0.25$ so as to give a molar ratio of Ba:Mg:Al:Eu=0.9:1.0:10.0:0.1. The resulting phosphor emitted blue color by irradiation with vacuum ultraviolet rays. When luminance of the phosphor before subjected to each of the treatments was taken as 100, the luminance of the phosphor after the heat treatment was 88, and the luminance of the phosphor after the plasma exposure treatment was 60.

Example 6

Production of $La_{0.95}Eu_{0.05}MgAl_{11}O_{19}$ (corresponding to the compound of the formula (I): $M^1_{1-a-b-c-d}M^2_aM^3_bM^4_{1-e}M^5_{11-f}M^6_{c+d+e+f}O_{19-(b+c+f)/2}$ wherein $M^1$ is La, $M^4$ is Mg, $M^5$ is Al, and $M^6$ is Eu, and a=0, b=0, c=0, d=0.05, e=0, and f=0):

Lanthanum oxide (purity: 99.99%; manufactured by Shin-Etsu Chemical Co., Ltd.), basic magnesium carbonate (purity: 99% or higher; manufactured by Kyowa Chemical Industry Co., Ltd.), aluminum hydroxide (purity: 99% or higher; manufactured by Sumitomo Chemical Co., Ltd.) and europium oxide (purity: 99.99%; manufactured by Shin-Etsu Chemical Co., Ltd.) were weighed $La_2O_3:(MgCO_3)_4Mg(OH)_2·5H_2O:Al_2O_3:Eu_2O_3=2.02:1.27:7.33:0.12$ so as to give a molar ratio of La:Mg:Al:Eu=0.95:1.0:11.0:0.05, and were mixed for 4 hours by a wet ball mill using isopropyl alcohol as a solvent. The solvent in the slurry was removed by an evaporator, and a mixed powder obtained by drying the slurry was calcined by keeping it at 1550° C. for 24 hours in an air atmosphere using an alumina crucible, and then slowly cooled to room temperature. The resulting phosphor emitted red color by irradiation with vacuum ultraviolet rays, and when luminance of the phosphor before subjected to each of the treatments was taken as 100, the luminance of the phosphor after the heat treatment was 100, and the luminance of the phosphor after the plasma exposure treatment was 99.

Comparative Example 3

Production of $Y_{1.9}Eu_{0.1}O_3$:

Yttrium oxide (purity: 99.99%; manufactured by Shin-Etsu Chemical Co., Ltd.) and europium oxide (purity: 99.99%; manufactured by Shin-Etsu Chemical Co., Ltd.) were weighed $Y_2O_3:Eu_2O_3=9.24:0.76$ so as to give a molar ratio of Y:Eu=1.9:0.1 and were mixed for 4 hours by a wet ball mill using isopropyl alcohol as a solvent. The solvent in the slurry was removed by an evaporator, and a mixed powder obtained by drying the slurry was put in an aluminum boat, calcined by keeping it at 1400° C. for 2 hours in an electric furnace having an air atmosphere, and then slowly cooled to room temperature. The resulting phosphor emitted red color by irradiation with vacuum ultraviolet rays, and when luminance of the phosphor before subjected to each of the treatments was taken as 100, the luminance of the phosphor after the heat treatment was 100, and the luminance of the phosphor after the plasma exposure treatment was 20.

What is claimed is:

1. A phosphor for vacuum ultraviolet ray-excited light-emitting elements which comprises a compound represented by the following formula (I)':

$$M^1{}_{1-a-b-c-d}M^2{}_aM^3{}_bM^4{}_{1-e}M^5{}_{11-f}M^6{}_{c+d+e+f}O_{19-(b+c+f)/2} \quad (I)'$$

wherein $M^1$ is at least one element selected from the group consisting of La, Y and Gd, $M^2$ is at least one element selected from the group consisting of Ce and Tb, $M^3$ is at least one element selected from the group consisting of Ca, Sr and Ba, $M^4$ consists of Mg and Zn, $M^5$ is at least one element selected from the group consisting of Al and Ga, and $M^6$ is at least one element selected from the group consisting of Mn and Eu, and a, b, c, d, e and f are numbers satisfying the conditions of $0 \leq a < 1$, $0 \leq b \leq 0.6$, $0 \leq c \leq 0.5$, $0 \leq d \leq 0.5$, $0 \leq e < 1$, $0 \leq f < 1$, $a+b+c+d<1$, and $0<c+d+e+f$, respectively.

2. A phosphor for vacuum ultraviolet ray-excited light-emitting elements which comprises a compound represented by the following formula (I)":

$$M^1{}_{1-a-b-c-d}M^2{}_aM^3{}_bM^4{}_{1-e}M^5{}_{11-f}M^6{}_{c+d+e+f}O_{19-(b+c+f)/2} \quad (I)"$$

wherein $M^1$ consists of La and Y, $M^2$ is at least one element selected from the group consisting of Ce and Tb, $M^3$ is at least one element selected from the group consisting of Ca, Sr and Ba, $M^4$ is at least one element selected from the group consisting of Mg and Zn, $M^5$ is at least one element selected from the group consisting of Al and Ga, and $M^6$ is at least one element selected from the group consisting of Mn and Eu, and a, b, c, d, e and f are numbers satisfying the conditions of $0 \leq a < 1$, $0 \leq b \leq 0.6$, $0 \leq c \leq 0.5$, $0 \leq d \leq 0.5$, $0 \leq e < 1$, $0 \leq f < 1$, $a+b+c+d<1$, and $0<c+d+e+f$, respectively.

3. A phosphor according to claim 1 or 2 wherein c, d, e and f satisfy the condition $0.001 \leq c+d+e+f \leq 1$.

4. A phosphor according to claim 3 or 2, wherein $M^5$ is Al.

5. A phosphor which comprises a compound represented by the following formula (II):

$$(M^7{}_{1-g}M^8{}_g)(Mg_{1-h-i}Zn_h)Al_{11-j}Mn_{i+j}O_{19-(g+j)/2} \quad (II)$$

wherein $M^7$ is at least one element selected from the group consisting of La, Y and Gd and $M^8$ is at least one element selected from the group consisting of Ca, Sr and Ba, and g, h, i and j are numbers satisfying the conditions of $0<g \leq 0.6$, $0 \leq h \leq 1$, $0 \leq i \leq 0.5$, $0 \leq j \leq 0.5$, $h+i \leq 1$, and $0<i+j \leq 0.5$, respectively.

6. A phosphor which comprises a compound represented by the following formula (III):

$$(M^9{}_{1-k-m}M^{10}{}_kEU_m)(Mg_{1-n}Zn_n)Al_{11}O_{19-(k+m)/2} \quad (III)$$

wherein $M^9$ is at least one element selected from the group consisting of La, Y and Gd and $M^{10}$ is at least one element selected from the group consisting of Ca, Sr, and Ba, and k, m and n are numbers satisfying the conditions of $0<k \leq 0.6$, $0<m \leq 0.4$, $0 \leq n \leq 1$, and $k+m<1$, respectively.

7. A vacuum ultraviolet ray-excited light-emitting element comprising a phosphor for vacuum ultraviolet ray-excited light-emitting elements which comprises a compound represented by the following formula (I):

$$M^1{}_{1-a-b-c-d}M^2{}_aM^3{}_bM^4{}_{1-e}M^5{}_{11-f}M^6{}_{c+d+e+f}O_{19-(b+c+f)/2} \quad (I)$$

wherein $M^1$ is at least one element selected from the group consisting of La, Y and Gd, $M^2$ is at least one element selected from the group consisting of Ce and Tb, $M^3$ is at least one element selected from the group consisting of Ca, Sr and Ba, $M^4$ is at least one element selected from the group consisting of Mg and Zn, $M^5$ is at least one element selected from the group consisting of Al and Ga, and $M^6$ is at least one element selected from the group consisting of Mn and Eu, and a, b, c, d, e and f are numbers satisfying the conditions of $0 \leq a < 1$, $0 \leq b \leq 0.6$, $0 \leq c \leq 0.5$, $0 \leq d \leq 0.5$, $0 \leq e < 1$, $0 \leq f < 1$, $a+b+c+d<1$, and $0<c+d+e+f$, respectively.

8. A vacuum ultraviolet ray-excited light-emitting element comprising the phosphor of claim 3.

* * * * *